US010467008B2

(12) United States Patent
Levitan et al.

(10) Patent No.: US 10,467,008 B2
(45) Date of Patent: Nov. 5, 2019

(54) IDENTIFYING AN EFFECTIVE ADDRESS (EA) USING AN INTERRUPT INSTRUCTION TAG (ITAG) IN A MULTI-SLICE PROCESSOR

(71) Applicant: International Business Machines Corporation, Armonk, NY (US)

(72) Inventors: David S. Levitan, Austin, TX (US); Mehul Patel, Austin, TX (US); Albert J. Van Norstrand, Jr., Round Rock, TX (US); Phillip G. Williams, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 15/168,560

(22) Filed: May 31, 2016

(65) Prior Publication Data

US 2017/0344368 A1    Nov. 30, 2017

(51) Int. Cl.
*G06F 9/30* (2018.01)
*G06F 15/76* (2006.01)
(Continued)

(52) U.S. Cl.
CPC .......... *G06F 9/30145* (2013.01); *G06F 9/322* (2013.01); *G06F 9/3802* (2013.01);
(Continued)

(58) Field of Classification Search
CPC .. G06F 9/30018; G06F 9/30145; G06F 9/322; G06F 9/3802; G06F 9/3861; G06F 9/3891
See application file for complete search history.

(56) References Cited

U.S. PATENT DOCUMENTS

| | | | |
|---|---|---|---|
| 4,985,825 A | * | 1/1991 | Webb, Jr. ............. G06F 9/3865 711/169 |
| 5,781,752 A | | 7/1998 | Moshovos et al. |

(Continued)

FOREIGN PATENT DOCUMENTS

WO    WO-9802805 A1    1/1998

OTHER PUBLICATIONS

U.S. Appl. No. 15/162,998, to David S. Levitan et al., entitled, *Generating a Mask Vector for Determining a Processor Instruction Address Using an Instruction Tag in a Multi-Slice Processor*, assigned to International Business Machines Corporation, 40 pages.
(Continued)

*Primary Examiner* — Benjamin P Geib
*Assistant Examiner* — William V Nguyen
(74) *Attorney, Agent, or Firm* — Nathan M. Rau

(57) ABSTRACT

Methods and apparatus for identifying an effective address (EA) using an interrupt instruction tag (ITAG) in a multi-slice processor including receiving, by an instruction fetch unit of the processor, the interrupt ITAG; retrieving an effective address table (EAT) row from an EAT, wherein the EAT row comprises a range of EAs and a first ITAG of a range of ITAGs; accessing a processor instruction vector comprising a plurality of elements, each element corresponding to one of a plurality of ITAGs; applying a mask to the processor instruction vector to obtain a portion of the processor instruction vector that begins with an element corresponding to the first ITAG and is defined by an element corresponding to the interrupt ITAG; calculating an EA offset; and identifying the EA for the interrupt ITAG using the EA offset and the range of EAs in the retrieved EAT row.

20 Claims, 8 Drawing Sheets

(51) Int. Cl.
*G06F 9/32* (2018.01)
*G06F 9/38* (2018.01)

(52) U.S. Cl.
CPC .......... *G06F 9/3861* (2013.01); *G06F 9/3891* (2013.01); *G06F 15/76* (2013.01)

(56) References Cited

U.S. PATENT DOCUMENTS

| | | | |
|---|---|---|---|
| 5,832,288 | A | 11/1998 | Wong |
| 5,987,595 | A | 11/1999 | Yoaz et al. |
| 6,108,770 | A | 8/2000 | Chrysos et al. |
| 6,202,130 | B1 | 3/2001 | Scales, III et al. |
| 6,212,629 | B1 | 4/2001 | McFarland et al. |
| 6,266,744 | B1 | 7/2001 | Hughes et al. |
| 6,393,544 | B1 | 5/2002 | Bryg et al. |
| 6,553,480 | B1 | 4/2003 | Cheong et al. |
| 6,584,557 | B1 * | 6/2003 | Taylor .................. G06F 9/4492 711/220 |
| 6,622,237 | B1 | 9/2003 | Keller et al. |
| 6,625,715 | B1 * | 9/2003 | Mathews ............ G06F 12/1027 711/205 |
| 7,181,598 | B2 | 2/2007 | Jourdan et al. |
| 7,415,597 | B2 | 8/2008 | Filippo et al. |
| 7,600,099 | B2 * | 10/2009 | Le ........................ G06F 9/3824 712/220 |
| 7,689,812 | B2 | 3/2010 | Abernathy et al. |
| 7,711,929 | B2 | 5/2010 | Burky et al. |
| 7,958,336 | B2 | 6/2011 | Lahav et al. |
| 8,131,976 | B2 | 3/2012 | Doing et al. |
| 8,386,753 | B2 | 2/2013 | Eisen et al. |
| 8,516,230 | B2 | 8/2013 | Chen et al. |
| 8,892,841 | B2 | 11/2014 | Gunna et al. |
| 8,943,299 | B2 | 1/2015 | Ekanadham et al. |
| 8,966,232 | B2 | 2/2015 | Tran |
| 9,361,114 | B1 * | 6/2016 | Tene ..................... G06F 9/3861 |
| 9,513,926 | B2 | 12/2016 | Snyder, II et al. |
| 10,114,794 | B2 | 10/2018 | Col et al. |
| 2003/0065909 | A1 | 4/2003 | Jourdan |
| 2005/0228972 | A1 | 10/2005 | Eisen et al. |
| 2008/0082794 | A1 | 4/2008 | Yu et al. |
| 2009/0063823 | A1 | 3/2009 | Burky et al. |
| 2010/0205384 | A1 | 8/2010 | Beaumont-Smith et al. |
| 2010/0262813 | A1 | 10/2010 | Brown et al. |
| 2010/0262967 | A1 | 10/2010 | Eisen et al. |
| 2014/0129806 | A1 | 5/2014 | Kaplan |
| 2014/0281384 | A1 | 9/2014 | Zeng |
| 2015/0046690 | A1 | 2/2015 | Eickemeyer et al. |
| 2015/0120985 | A1 | 4/2015 | Frey et al. |
| 2015/0324204 | A1 | 11/2015 | Eisen et al. |
| 2017/0329607 | A1 | 11/2017 | Eickemeyer et al. |
| 2017/0329715 | A1 | 11/2017 | Eickemeyer et al. |
| 2017/0344378 | A1 | 11/2017 | Giri et al. |
| 2017/0344379 | A1 | 11/2017 | Levitan et al. |
| 2017/0344469 | A1 | 11/2017 | Giri et al. |

OTHER PUBLICATIONS

U.S. Appl. No. 15/168,434, to Akash V. Giri et al., entitled, *Managing an Effective Address Table in a Multi-Slice Processor*, assigned to International Business Machines Corporation, 32 pages.

U.S. Appl. No. 15/155,327, to Richard J. Eickemeyer et al., entitled *Hazard Avoidance in a Multi-Slice Processor*, assigned to International Business Machines Corporation, 35 pages.

U.S. Appl. No. 15/220,028, to Richard J. Eickemeyer et al., entitled *Hazard Avoidance in a Multi-Slice Processor*, assigned to International Business Machines Corporation, 35 pages.

U.S. Appl. No. 15/220,798, to Akash V. Giri et al., entitled, *Managing an Effective Address Table in a Multi-Slice Processor*, assigned to International Business Machines Corporation, 32 pages.

Anonymous, "Thermometer Mask Generation Using log2(N)-1 bits", An IP.com Prior Art Database Technical Disclosure (online), IP.com No. 000228833, URL: http://ip.com/IPCOM/000228833, dated Jul. 9, 2013, 6 pages.

Anonymous, "Method and Apparatus for Early Fetch Redirection in a Computer Processor", An IP.com Prior Art Database Technical Disclosure (online), IP.com No. 000223643, URL: http://ip.com/IPCOM/000223643, dated Nov. 20, 2012, 6 pages.

Gandhi et al., "Scalable Load and Store Processing in Latency Tolerant Processors", Proceedings of the 32$^{nd}$ International Symposium on Computer Architecture (ISCA'05), Jun. 2005, 12 pages, IEEE Computer Society, Piscataway, NJ.

Sinharoy, et al., "IBM POWER8 Processor Core Microarchitecture", IBM Journal of Research and Development, vol. 59, No. 1, Paper 2, Digital Object Identifier: 10.1147/JRD.2014.2376112, dated Jan./Feb. 2015, 21 pages.

Appendix P; List of IBM Patents of Application Treated as Related, Aug. 17, 2016, 2 pages.

Anonymous, "Quadrant based Instruction ID assignment for SMT (Simultaneous Multithreading) microprocessor", An IP.com Prior Art Database Technical Disclosure (online), IP.com No. 000239611, URL: http://ip.com/IPCOM/000239611, dated Nov. 19, 2014, 4 pages.

Motorola et al., "A Novel High-Effective Land Control Method in 3G Systems", An IP.com Prior Art Database Technical Disclosure (online), IP.com No. 000136665, URL: http://ip.com/IPCOM/000136665, dated May 26, 2006, 5 pages.

* cited by examiner

IDENTIFYING AN EFFECTIVE ADDRESS (EA) USING AN INTERRUPT INSTRUCTION TAG (ITAG) IN A MULTI-SLICE PROCESSOR

BACKGROUND

Field of the Invention

The field of the invention is data processing, or, more specifically, methods, apparatus, and products for identifying an effective address (EA) using an interrupt instruction tag (ITAG) in a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for identifying an effective address (EA) using an interrupt instruction tag (ITAG) in a multi-slice processor are disclosed in this application. Identifying an EA using an interrupt ITAG in a multi-slice processor includes receiving, by an instruction fetch unit of the processor, the interrupt ITAG; retrieving an effective address table (EAT) row from an EAT, wherein the EAT row comprises a range of EAs and a first ITAG of a range of ITAGs associated with the range of EAs, the range of ITAGs comprising the interrupt ITAG; generating a mask using the retrieved EAT row; accessing a processor instruction vector comprising a plurality of elements, each element corresponding to one of a plurality of ITAGs, wherein one or more of the elements include a flag set indicating a processor instruction decoded for one or more of the plurality of ITAGs; applying the mask to the processor instruction vector to obtain a portion of the processor instruction vector that begins with an element corresponding to the first ITAG and is defined by an element corresponding to the interrupt ITAG; calculating an EA offset based on a number of elements in the portion of the processor instruction vector having a flag set; and identifying the EA for the interrupt ITAG using the EA offset and the range of EAs in the retrieved EAT row.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
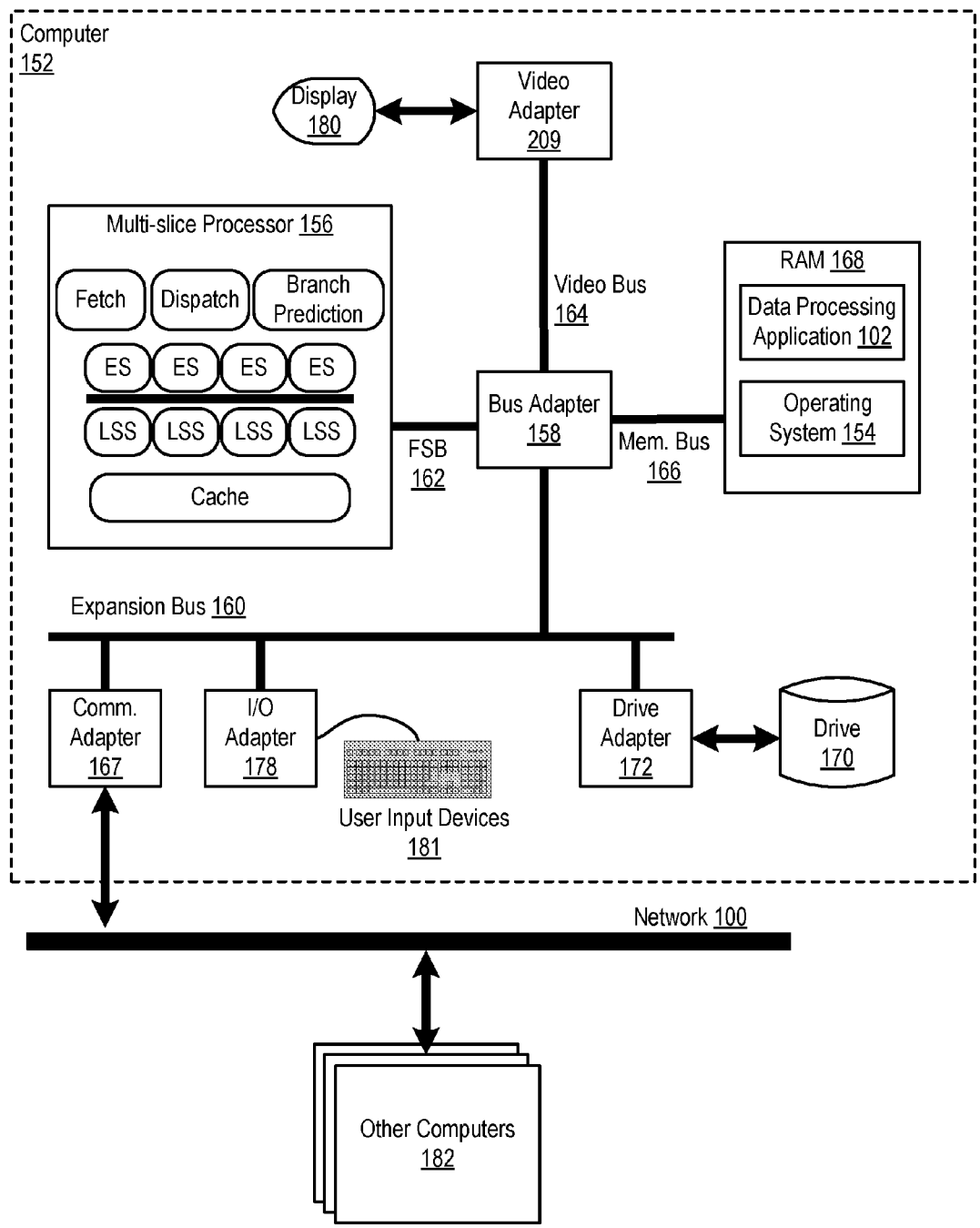
FIG. 1 sets forth an example system configured for identifying an effective address (EA) using an interrupt instruction tag (ITAG) in a multi-slice processor.

Exemplary methods, apparatus, and products for identifying an effective address (EA) using an interrupt instruction tag (ITAG) in a multi-slice processor in accordance with the present invention are described with reference to the accompanying drawings, beginning with FIG. 1. FIG. 1 sets forth a network diagram of a system configured for identifying an EA using an interrupt ITAG in a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS'). Each execution slice may be configured to provide components that support execution of instructions: an issue queue, a general purpose register (GPR), a history buffer, an arithmetic logic unit (212) (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
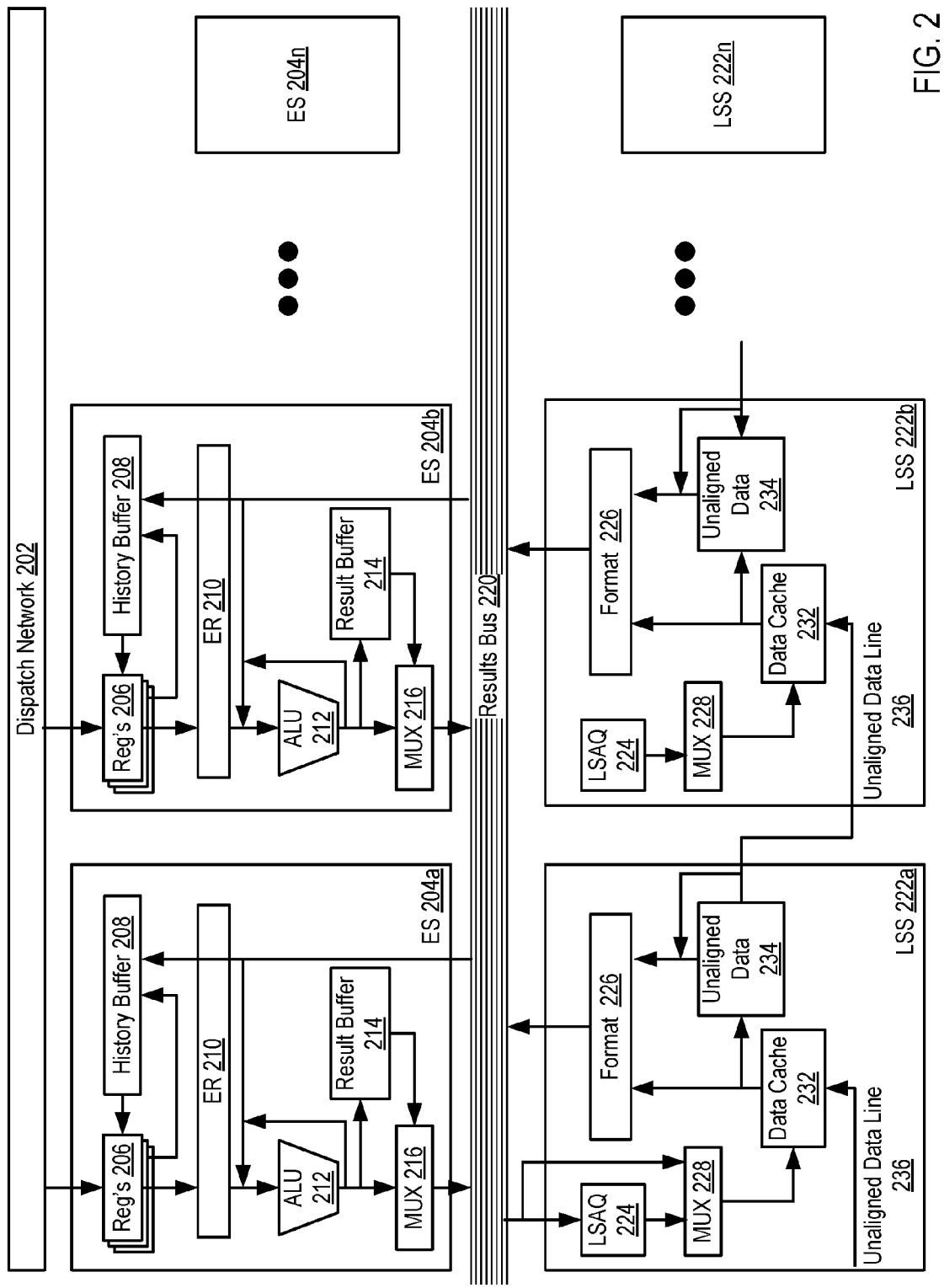
FIG. 2 sets forth an example system configured for identifying an EA using an interrupt ITAG in a multi-slice processor.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes a general purpose register (GPR) (206) and a history buffer (208). The general purpose register and history buffer may sometimes be referred to as the mapping facility, as the registers are utilized for register renaming and support logical registers.

The general purpose register (206) is configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load slice (222a-222n) via the results bus (220).

The arithmetic logic unit depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus may be configured in a variety of manners and be composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), unaligned data logic (234) and formatting logic (226). The queue receives load and store operations to be carried out by the load/store slice (222).

The unaligned data logic (234) of each slice is coupled to the unaligned data logic of another slice through the unaligned data line (236). The unaligned data logic (234) enables data to be stored and retrieved across multiple load/store slices. The formatting logic (226) formats data into a form that may be returned on the results bus (220) to an execution slice as a result of a load instruction.

Figure 3:
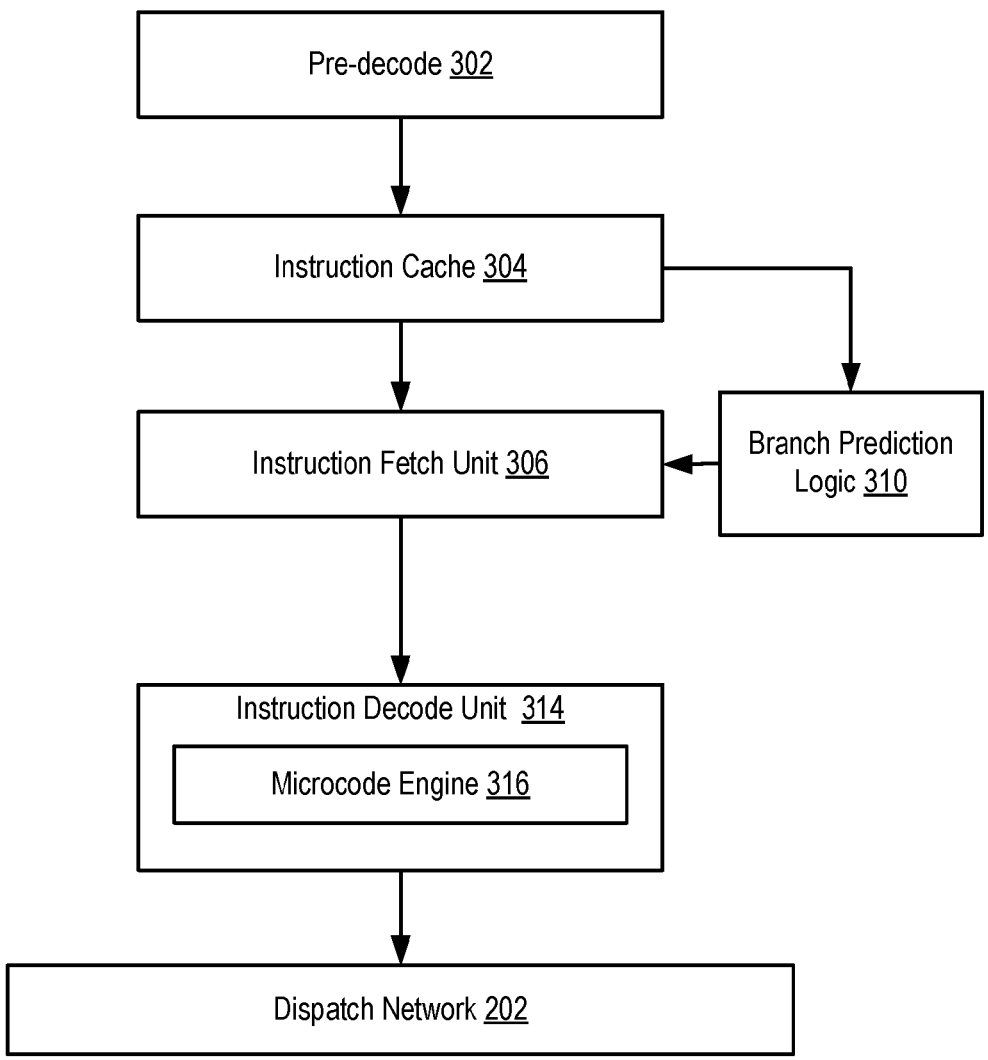
FIG. 3 sets forth an example system configured for identifying an EA using an interrupt ITAG in a multi-slice processor.

For further explanation, FIG. 3 sets forth a block diagram of another portion of a multi-slice processor according to embodiments of the present invention. The example multi-slice processor of FIG. 3 includes pre-decode logic (302) configured to retrieve instructions from memory, perform a preliminary decode of the instruction and store the pre-decoded instruction into an instruction cache (304).

The example multi-slice processor of FIG. 3 also includes branch prediction logic (310). Branch prediction logic generally performs branch prediction for pre-decoded instructions and tracks various branch prediction statistics for executing and executed instructions. The branch prediction logic (310) may include or access various registers and storage that contain such branch prediction statistics. Examples of storage entities may include global branch history tables and the like.

The example multi-slice processor of FIG. 3 also includes an instruction fetch unit (306). An instruction fetch unit (306) generally retrieves instructions from the instruction cache and provides the fetched instruction to instruction decode logic (308).

The example instruction decode unit (314) of FIG. 3 performs a final decode operation on the fetched instructions and provides the decoded instructions to the dispatch network (202). The example instruction decode unit (314) of FIG. 3 also includes a microcode engine (316). The microcode engine generally performs a portion of decoding an instruction in which machine code is translated into hardware-level instructions. Additionally, as described below in greater detail, the example microcode engine of FIG. 3 may also assist in the performance of thread migration in the multi-slice processor. The dispatch network as described above, dispatches the decoded instructions among slices.

Figure 4:
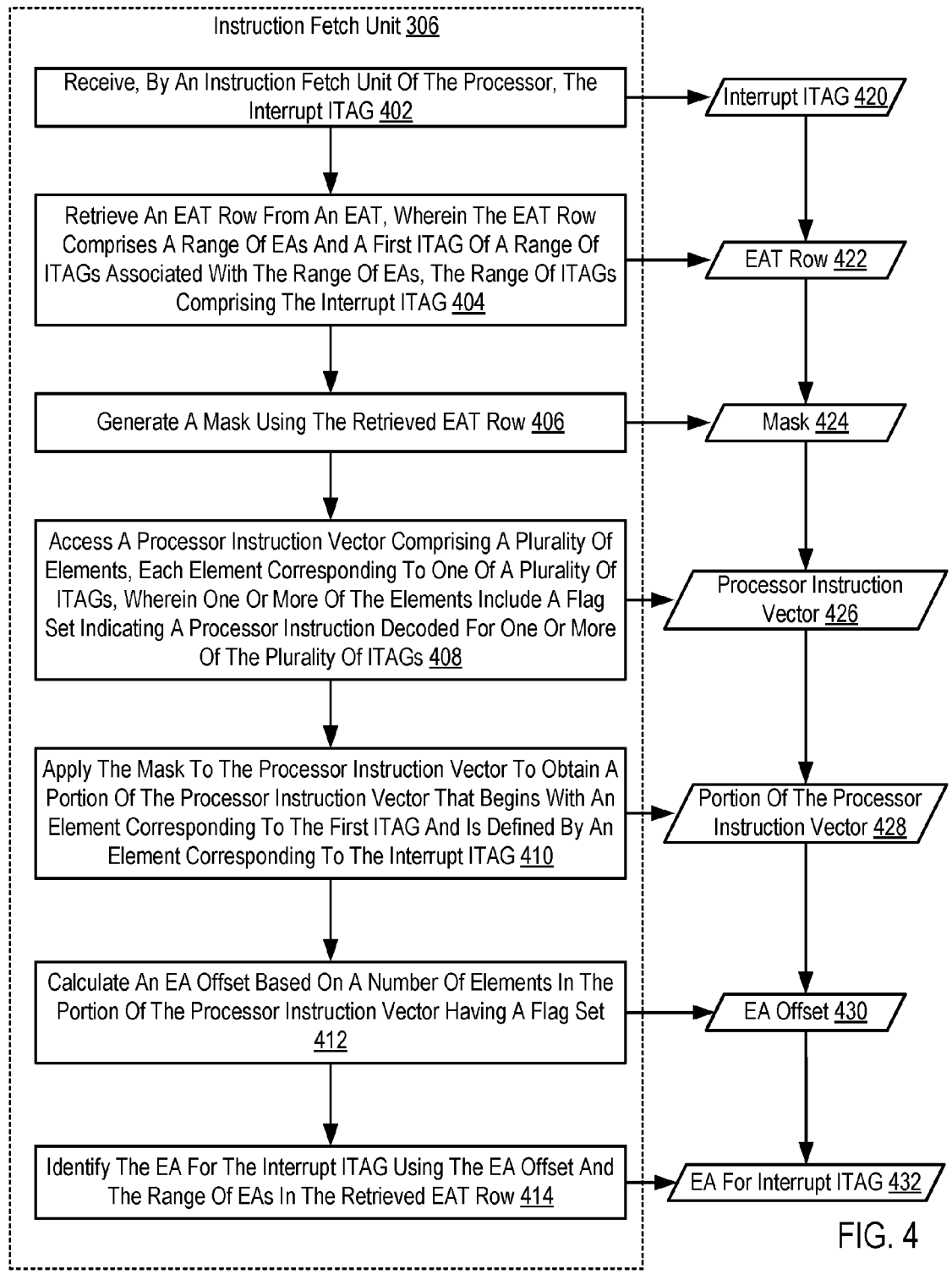
FIG. 4 sets forth a flow chart illustrating an exemplary method for identifying an EA using an interrupt ITAG in a multi-slice processor.

For further explanation, FIG. 4 sets forth a flow chart illustrating an exemplary method for identifying an effective address (EA) using an interrupt instruction tag (ITAG) in a multi-slice processor according to embodiments of the present invention that includes receiving (402), by an instruction fetch unit (306) of the processor, the interrupt ITAG (420). An ITAG is an instruction identifier. Each ITAG tracks an internal instruction from decode to completion. Each internal instruction may be assigned an ITAG by an ITAG assignment unit, which assigns ITAGs sequentially to internal instructions before the internal instructions are transmitted to a dispatch unit. An ITAG may be implemented as a set of binary bits. An interrupt ITAG (420) is an ITAG assigned to an internal operation that the instruction fetch unit (306) uses as a reference point to begin to refetch processor instructions.

Receiving (402), by an instruction fetch unit (306) of the processor, the interrupt ITAG (420) may be carried out by receiving the interrupt ITAG (420) as part of a flush procedure. Specifically, the instruction fetch unit (306) may receive the interrupt ITAG (420) in the form of a flush ITAG that instructs the instruction fetch unit (306) to begin refetching instructions based on the processor instruction corresponding to the received interrupt ITAG (420). The flush ITAG may be issued by the instruction sequencer unit, load store unit, or branch prediction logic (310).

The EA of a processor instruction may not be tracked outside of the instruction fetch unit (306). Elements outside of the instruction fetch unit (306) may reference a processor instruction using an ITAG assigned to an internal operation generated from the processor instruction.

FIG. 4 also includes retrieving (404) an effective address table (EAT) row from an EAT, wherein the EAT row comprises a range of EAs and a first ITAG of a range of ITAGs associated with the range of EAs, the range of ITAGs comprising the interrupt ITAG. Retrieving (404) an effective address table (EAT) row from an EAT, wherein the EAT row comprises a range of EAs and a first ITAG of a range of ITAGs associated with the range of EAs, the range of ITAGs comprising the interrupt ITAG may be carried out by identifying one EAT row of a set of EAT rows that includes the interrupt ITAG.

The EAT is a table comprising EAT rows. Each EAT row includes a range of EAs and a first ITAG. The range of EAs may be stored using a first EA and a last EA. Each EAT row may include a first ITAG without including the last ITAG in the range of ITAGs. For example, an EAT row may include a first EA, a last EA, and a first ITAG. An example EAT row may include a first EA of 111, a last EA of 115, and a first ITAG of 9.

Each EA is used to store a processor instruction. Processor instructions are decoded into internal operations, and each internal operation is tracked using an ITAG. Processor instructions may be decoded into a single internal operation or may be decoded into a plurality of internal operations. The range of EAs in each EAT row may be set for a number of reasons. For example, the range of EAs may correspond to a set of instructions before a branch was taken or before the end of a cache line was reached. The first ITAG of the first instruction corresponding to the first EA in the EAT row is stored in the EAT after that instruction is fetched and during the decode process.

The first ITAG in the EAT row is the first ITAG in a range of ITAGs assigned to the internal operations generated from decoding the processor instructions stored in each of the EAs in the range of EAs. This range of ITAGs may include a greater number of ITAGs than the number of EAs in the range of EAs.

TABLE 1

| EA First | EA Last | First ITAG | Lookup Vector |
|---|---|---|---|
| 0x110 | 0x119 | 14 | 1 |
| 0x120 | 0x120 | 37 | 1 |
| 0x121 | 0x125 | 69 | 1 |
| 0x126 | 0x130 | 95 | 0 |
| 0x131 | 0x150 | 112 | 0 |

Table 1 shows an example EAT. The first EAT row in the example EAT includes the EAs from 110 to 119, and a first ITAG of 14. The next EAT row has a first ITAG of 37. Therefore, the range of ITAGs for the first EAT row may include 23 ITAGs (ITAG 14 through ITAG 36) associated with 10 EAs (EA 110 to EA 119). This example indicates that 10 processor instructions (stored at EA 110 through EA 119) were decoded into 23 internal operations that were assigned ITAG 14 through ITAG 26. Note that the EAs have been simplified for the purposes of the example EAT of Table 1. Each instruction may be 4 bytes, and so consecutively stored EAs may be separated by 4 EAs.

FIG. 4 also includes generating (406) a mask using the retrieved EAT row. Generating (406) a mask using the retrieved EAT row may be carried out by generating a bit vector to mask each element of a processor instruction vector (426) except those elements that correspond to the range of ITAGs that begin with the first ITAG in the retrieved EAT row. For example, a mask may include a number of elements each corresponding to the elements in a processor instruction vector (426). Each element of the mask may have an associated flag. The mask may have a set of flags set on a group of elements that correspond to a subset or portion of the processor instruction vector that corresponds to the range of ITAGs that begins with the first ITAG of the retrieved EAT row and ends with (but may not include) the interrupt ITAG (420).

FIG. 4 also includes accessing (408) a processor instruction vector (426) comprising a plurality of elements, each element corresponding to one of a plurality of ITAGs, wherein one or more of the elements include a flag set indicating a processor instruction decoded for one or more of the plurality of ITAGs. Accessing (408) a processor instruction vector comprising a plurality of elements, each element corresponding to one of a plurality of ITAGs, wherein one or more of the elements include a flag set indicating a processor instruction decoded for one or more of the plurality of ITAGs may be carried out by compiling the processor instruction vector (426) and reading the plurality of elements within the processor instruction vector (426).

During transmit time, as processor instructions are decoded, each assigned ITAG is sent to an instruction sequencer unit with an indication regarding whether the ITAG should be associated with a processor instruction. The instruction sequencer unit collects the ITAGs and indications into the processor instruction vector (426). Each element in the processor instruction vector (426) corresponds to an ITAG assigned to an internal instruction generated from a processor instruction. Each group of elements corresponding to a group of ITAGs generated from a single processor instruction may have a single flag set among the elements, representing the processor instruction.

For example, if one processor instruction is decoded into 10 internal operations assigned 10 ITAGs, the processor instruction vector (426) includes 10 elements corresponding to the 10 ITAGs, and one of the 10 elements will have a flag set (e.g., the last element). The remaining 9 elements will not have the flag set (e.g., the first 9 elements). Represented as a bit vector, this example may be expressed as "0000000001". The next processor instruction may be decoded into 1 internal operation and assigned 1 ITAG. An additional element is then added to the processor instruction vector (426), and the flag for that element is set. The combined example processor instruction vector (426), represented as a bit vector, may then be expressed as "00000000011".

FIG. 4 also includes applying (410) the mask (424) to the processor instruction vector (426) to obtain a portion of the processor instruction vector (428) that begins with an element corresponding to the first ITAG and is defined by an element corresponding to the interrupt ITAG. Applying (410) the mask (424) to the processor instruction vector (426) to obtain a portion of the processor instruction vector (428) that begins with an element corresponding to the first ITAG and is defined by an element corresponding to the interrupt ITAG may be carried out by using the mask to extract the portion of the processor instruction vector (428) from the processor instruction vector (426). The mask (424) may be used to reduce the amount of processing necessary to obtain the EA for the interrupt ITAG (432). Specifically, the mask (424) may reduce the portion of the processor instruction vector (428) that must be inspected to identify the EA for the interrupt ITAG (432).

The portion of the processor instruction vector (428) may be defined by an element corresponding to the interrupt ITAG in that the last element in the portion of the processor vector (428) may be selected based on the location of the element corresponding to the interrupt ITAG (420). For example, the portion of the processor instruction vector (428) may be each element in the processor instruction vector (426) beginning with the element corresponding to the first ITAG and ending with the element just previous to the element corresponding to the interrupt ITAG (420), but not including the element corresponding to the interrupt ITAG (420).

Applying (410) the mask (424) to the processor instruction vector (426) may be carried out by performing a bitwise AND operation on the processor instruction vector (426) using the mask (424). For example, the processor instruction vector (426) may be implemented as a bit vector made up of 256 bits. The mask (424) may be implemented as a bit vector of equal size, that includes a 'down' or '0' bit for each bit in the processor instruction vector (426) that is not part of desired portion of the processor instruction vector (428)

(i.e., is not a bit that corresponds to the range of ITAGs that begins with the element that corresponds to the first ITAG and ends with the element just previous to the element that corresponds to the interrupt ITAG). As an abbreviated example, assume that the processor instruction vector (426) is '00011101110110010000000100000101'. Assume further that the mask (424) is '00000000111111110000000000000000'. By applying the processor instruction vector (426) to the mask (424), we would obtain the portion of the processor instruction vector (428) that is '00000000110110010000000000000000'.

FIG. 4 also includes calculating (412) an EA offset based on a number of elements in the portion of the processor instruction vector having a flag set. Calculating (412) an EA offset based on a number of elements in the portion of the processor instruction vector having a flag set may be carried out by identifying the number of 'up' or '1' bits among the elements beginning with the element corresponding to the first ITAG and extending a number of elements equal to the difference between the first ITAG and the interrupt ITAG. The EA offset may be calculated based on taking the $n^{th}$ EA from the range of EAs (e.g., the $5^{th}$ EA). Alternatively, the EA offset may be calculated to as a value to add to the first EA in the range of EAs of the retrieved EAT row (422) (e.g., add a value of 5 to the first EA in the range of EAs).

For example, assume that the first ITAG is 8 and the interrupt ITAG is 16. Further assume that the portion of the processor instruction vector (428) is '00000000110110010000000000000000'. The number of '1's in the range of elements beginning with the 9th element and ending with the 16th element (corresponding to a starting ITAG of 8 and ending with an ITAG of 15 (15 is the element just previous to the element corresponding to an ITAG of 16)) is 5. Therefore, the EA offset in this example is 5.

FIG. 4 also includes identifying (414) the EA for the interrupt ITAG (432) using the EA offset and the range of EAs in the retrieved EAT row. Identifying (414) the EA for the interrupt ITAG (432) using the EA offset and the range of EAs in the retrieved EAT row may be carried out by applying the EA offset (430) to the range of EAs in the EAT row to obtain the EA for the interrupt ITAG (432). Identifying (414) the EA for the interrupt ITAG (432) using the EA offset and the range of EAs in the retrieved EAT row may be carried out by selecting the EA at the position in the range of EAs in the retrieved EAT row indicated by the EA offset. An EA offset is a value indicating the position within the range of EAs in the retrieved EAT row (422) at which the EA for the interrupt ITAG (432) is located. For example, if the EA offset is 5, the next EA following the offset from the first EA (i.e., Start EA in the EAT row) may be selected, which would be the $6^{th}$ EA.

For example, assume that the EA offset is 4 as calculated in the previous example. Using an EA offset of 5, the EA for the interrupt ITAG (432) is the sixth EA in the range of EAs in the retrieved EAT row. For example, assume the EAT row includes a first EA of 111, a last EA of 117, and a first ITAG of 8. The EA for the interrupt ITAG in this example is 116, which is the sixth EA in the range of EAs (using an offset of 5).

Figure 5:
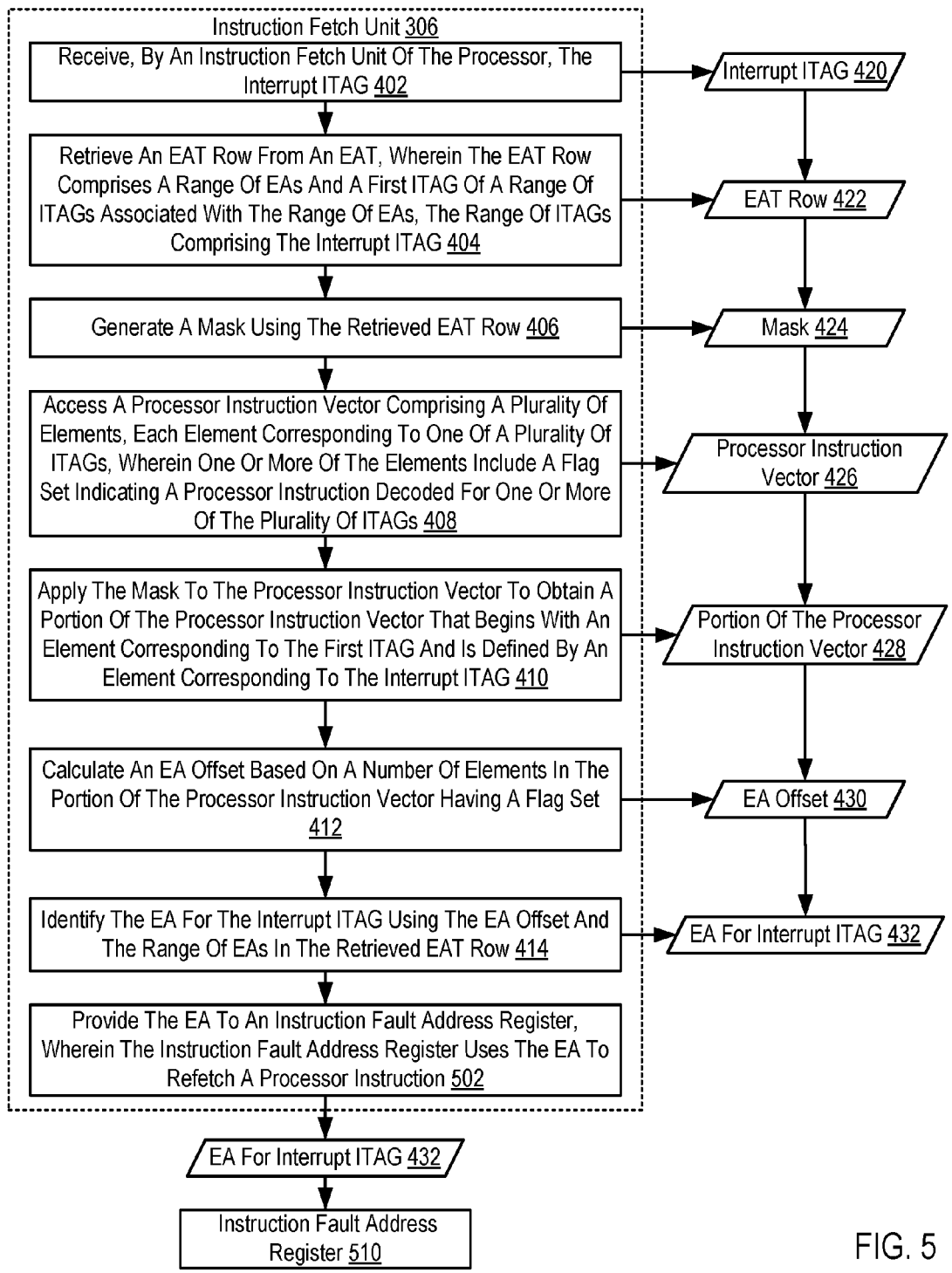
FIG. 5 sets forth a flow chart illustrating an exemplary method for identifying an EA using an interrupt ITAG in a multi-slice processor.

For further explanation, FIG. 5 sets forth a flow chart illustrating a further exemplary method for identifying an EA using an interrupt ITAG in a multi-slice processor according to embodiments of the present invention that includes receiving (402), by an instruction fetch unit of the processor, the interrupt ITAG (420); retrieving (404) an EAT row (422) from an EAT, wherein the EAT row (422) comprises a range of EAs and a first ITAG of a range of ITAGs associated with the range of EAs, the range of ITAGs comprising the interrupt ITAG; generating (406) a mask (424) using the retrieved EAT row (422); accessing (408) a processor instruction vector (426) comprising a plurality of elements, each element corresponding to one of a plurality of ITAGs, wherein one or more of the elements include a flag set indicating a processor instruction decoded for one or more of the plurality of ITAGs; applying (410) the mask (424) to the processor instruction vector (426) to obtain a portion of the processor instruction vector (428) that begins with an element corresponding to the first ITAG and is defined by an element corresponding to the interrupt ITAG; calculating (412) an EA offset based on a number of elements in the portion of the processor instruction vector having a flag set; and identifying (414) the EA for the interrupt ITAG (432) using the EA offset (430) and the range of EAs in the retrieved EAT row (422).

The method of FIG. 5 differs from the method of FIG. 4, however, in that FIG. 5 further includes providing (502) the EA (432) to an instruction fault address register (510), wherein the instruction fault address register (510) uses the EA (432) to refetch a processor instruction. Providing (502) the EA (432) to an instruction fault address register (510), wherein the instruction fault address register (510) uses the EA (432) to refetch a processor instruction may be carried out by storing the EA for the interrupt ITAG (432) in an instruction fault address register (510). Once stored in the instruction fault address register (510), the processor instruction stored at the EA for the interrupt ITAG (432) may then be refetched and decoded. The processor instruction stored in the EA for the interrupt ITAG (432) may be refetched and decoded as part of a group of processor instructions corresponding to a range of EAs.

Figure 6:
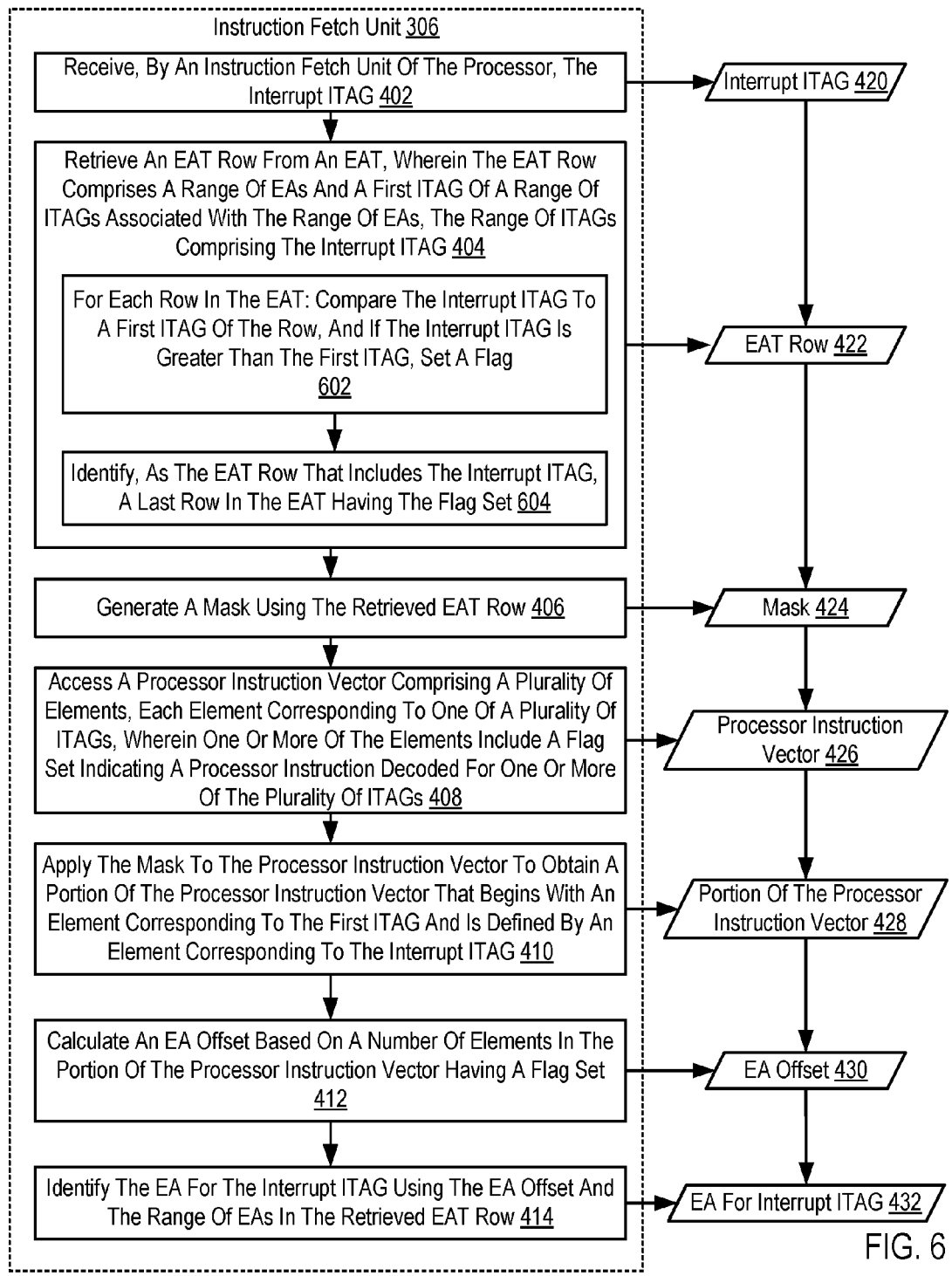
FIG. 6 sets forth a flow chart illustrating an exemplary method for identifying an EA using an interrupt ITAG in a multi-slice processor.

For further explanation, FIG. 6 sets forth a flow chart illustrating a further exemplary method for identifying an EA using an interrupt ITAG in a multi-slice processor according to embodiments of the present invention that includes receiving (402), by an instruction fetch unit of the processor, the interrupt ITAG (420); retrieving (404) an EAT row (422) from an EAT, wherein the EAT row (422) comprises a range of EAs and a first ITAG of a range of ITAGs associated with the range of EAs, the range of ITAGs comprising the interrupt ITAG; generating (406) a mask (424) using the retrieved EAT row (422); accessing (408) a processor instruction vector (426) comprising a plurality of elements, each element corresponding to one of a plurality of ITAGs, wherein one or more of the elements include a flag set indicating a processor instruction decoded for one or more of the plurality of ITAGs; applying (410) the mask (424) to the processor instruction vector (426) to obtain a portion of the processor instruction vector (428) that begins with an element corresponding to the first ITAG and is defined by an element corresponding to the interrupt ITAG; calculating (412) an EA offset based on a number of elements in the portion of the processor instruction vector having a flag set; and identifying (414) the EA for the interrupt ITAG (432) using the EA offset (430) and the range of EAs in the retrieved EAT row (422).

The method of FIG. 6 differs from the method of FIG. 4, however, in that retrieving (404) an EAT row (422) from an EAT, wherein the EAT row (422) comprises a range of EAs and a first ITAG of a range of ITAGs associated with the range of EAs, the range of ITAGs comprising the interrupt ITAG includes, for each row in the EAT, comparing (602) the interrupt ITAG (420) to a first ITAG of the row, and if the interrupt ITAG (420) is greater than the first ITAG, setting a flag; and identifying (604), as the EAT row (422) that includes the interrupt ITAG (420), a last row in the EAT having the flag set.

For each row in the EAT, comparing (602) the interrupt ITAG (420) to a first ITAG of the row, and if the interrupt ITAG (420) is greater than the first ITAG, setting a flag may be carried out by generating a lookup vector. The lookup vector may include a set of bits, each corresponding to an EAT row. The instruction fetch unit (306) may access the first ITAG in an EAT row, and compare the first ITAG in that EAT row to the interrupt ITAG. If the interrupt ITAG is greater than or equal to the first ITAG, then the flag may be set by setting the corresponding bit in the lookup vector as 'up' or to '1'.

Referring again to the example EAT of Table 1 above, if an interrupt ITAG of 73 is received, the ITAG 73 is compared to the first ITAG of each row, and if the ITAG 73 is larger than (or equal to) the first ITAG in the EAT row, then a 1 is set in the corresponding location of the lookup vector. As shown in Table 1, because 73 is larger than the first ITAG of the first three rows, a '1' has been placed in the corresponding locations in the lookup vector. For the last two EAT rows, the interrupt ITAG is not larger than the first ITAGs, and therefore a '0' has been placed in the corresponding locations in the lookup vector.

Identifying (604), as the EAT row (422) that includes the interrupt ITAG (420), a last row in the EAT having the flag set may be carried out by identifying the position in the lookup vector of the transition from a flag set to no flag set. Using the above example, for the lookup vector "1111000000", the position of the transition from a flag set to no flag set is the fourth position in the vector. Based on this determination of the position, the fourth EAT row is identified as the EAT row that includes the interrupt ITAG (420).

Figure 7:
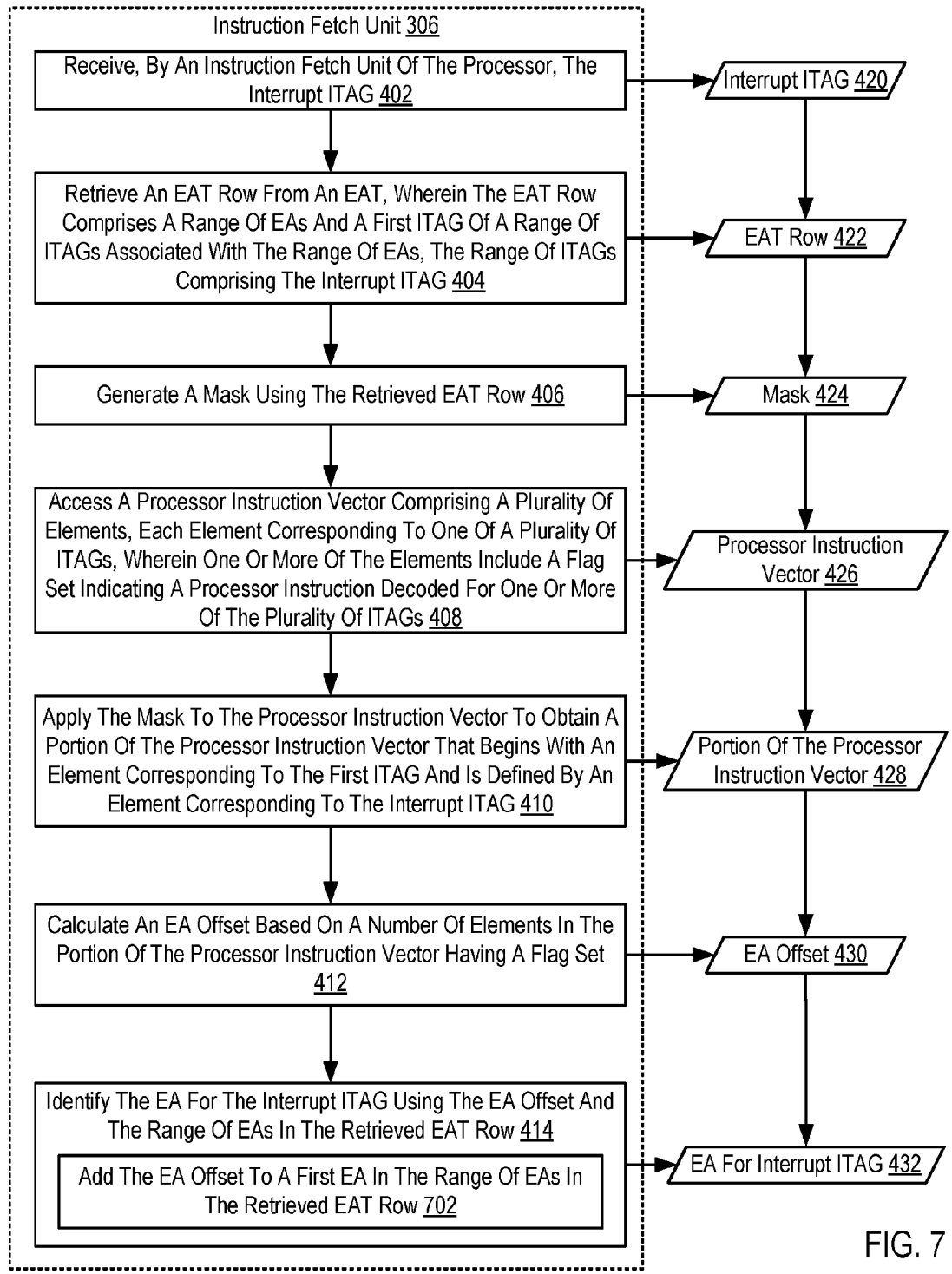
FIG. 7 sets forth a flow chart illustrating an exemplary method for identifying an EA using an interrupt ITAG in a multi-slice processor.

For further explanation, FIG. 7 sets forth a flow chart illustrating a further exemplary method for identifying an EA using an interrupt ITAG in a multi-slice processor according to embodiments of the present invention that includes receiving (402), by an instruction fetch unit of the processor, the interrupt ITAG (420); retrieving (404) an EAT row (422) from an EAT, wherein the EAT row (422) comprises a range of EAs and a first ITAG of a range of ITAGs associated with the range of EAs, the range of ITAGs comprising the interrupt ITAG; generating (406) a mask (424) using the retrieved EAT row (422); accessing (408) a processor instruction vector (426) comprising a plurality of elements, each element corresponding to one of a plurality of ITAGs, wherein one or more of the elements include a flag set indicating a processor instruction decoded for one or more of the plurality of ITAGs; applying (410) the mask (424) to the processor instruction vector (426) to obtain a portion of the processor instruction vector (428) that begins with an element corresponding to the first ITAG and is defined by an element corresponding to the interrupt ITAG; calculating (412) an EA offset based on a number of elements in the portion of the processor instruction vector having a flag set; and identifying (414) the EA for the interrupt ITAG (432) using the EA offset (430) and the range of EAs in the retrieved EAT row (422).

The method of FIG. 7 differs from the method of FIG. 4, however, in that identifying (414) the EA for the interrupt ITAG (432) using the EA offset (430) and the range of EAs in the retrieved EAT row (422) includes adding (702) the EA offset (430) to a first EA in the range of EAs in the retrieved EAT row (422). Adding (702) the EA offset (430) to a first EA in the range of EAs in the retrieved EAT row (422) may be carried out by obtaining a value of the EA offset and a value of the first EA in the range of EAs in the retrieved EAT row (422), and combining the values to calculate the EA for the interrupt ITAG (432). For example, assume that the EA offset is 5 as calculated in a previous example. Assume further that the EAT row includes a first EA of 110. Combining 110 and 5 produces an EA of 115.

Figure 8:
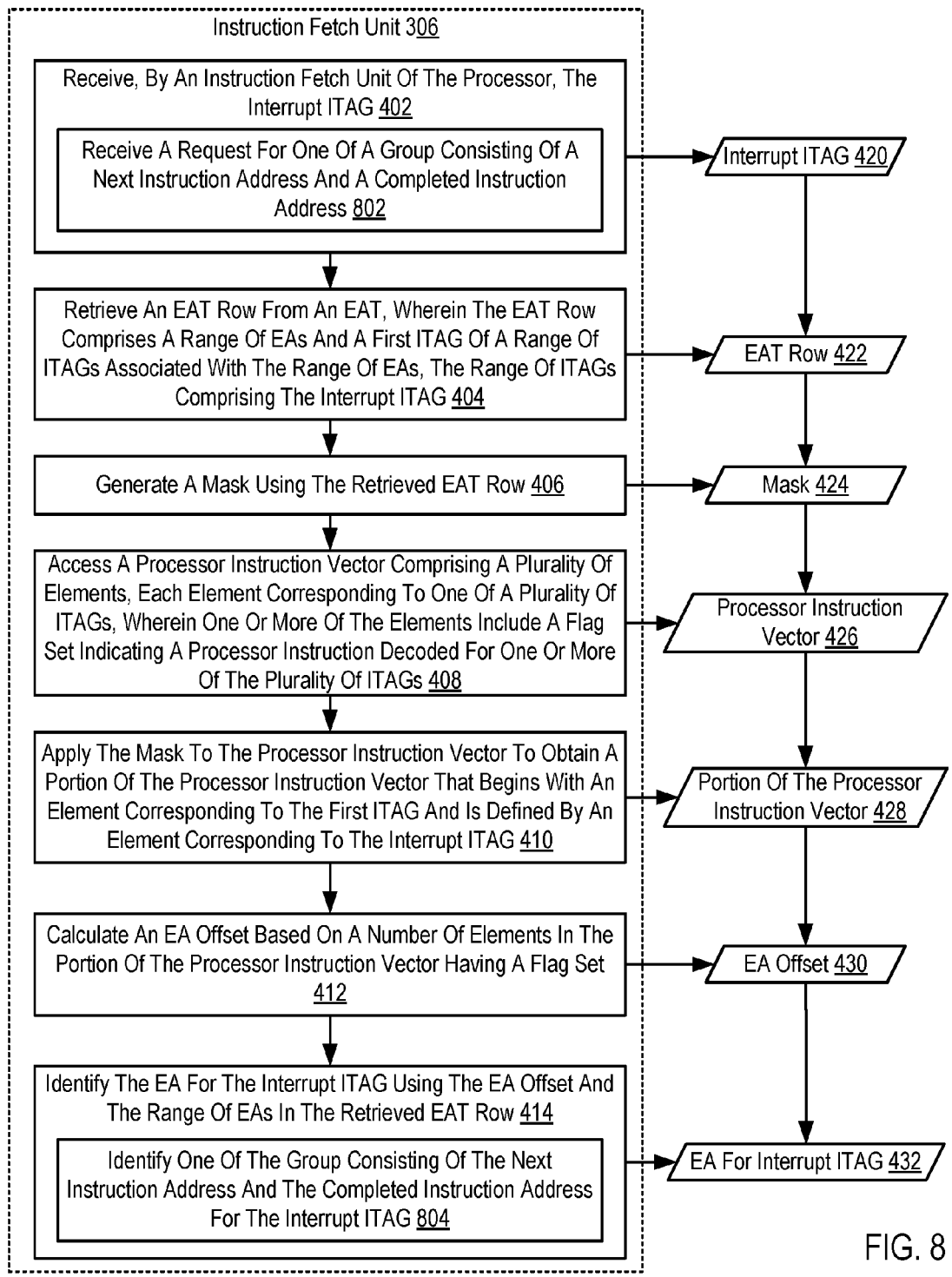
FIG. 8 sets forth a flow chart illustrating an exemplary method for identifying an EA using an interrupt ITAG in a multi-slice processor.

For further explanation, FIG. 8 sets forth a flow chart illustrating a further exemplary method for identifying an EA using an interrupt ITAG in a multi-slice processor according to embodiments of the present invention that includes receiving (402), by an instruction fetch unit of the processor, the interrupt ITAG (420); retrieving (404) an EAT row (422) from an EAT, wherein the EAT row (422) comprises a range of EAs and a first ITAG of a range of ITAGs associated with the range of EAs, the range of ITAGs comprising the interrupt ITAG; generating (406) a mask (424) using the retrieved EAT row (422); accessing (408) a processor instruction vector (426) comprising a plurality of elements, each element corresponding to one of a plurality of ITAGs, wherein one or more of the elements include a flag set indicating a processor instruction decoded for one or more of the plurality of ITAGs; applying (410) the mask (424) to the processor instruction vector (426) to obtain a portion of the processor instruction vector (428) that begins with an element corresponding to the first ITAG and is defined by an element corresponding to the interrupt ITAG; calculating (412) an EA offset based on a number of elements in the portion of the processor instruction vector having a flag set; and identifying (414) the EA for the interrupt ITAG (432) using the EA offset (430) and the range of EAs in the retrieved EAT row (422).

The method of FIG. 8 differs from the method of FIG. 4, however, in that receiving (402), by an instruction fetch unit of the processor, the interrupt ITAG (420) includes receiving (802) a request for one of a group consisting of a next instruction address (NIA) and a current instruction address (CIA). Receiving (802) a request for one of a group consisting of a NIA and a CIA may be carried out by receiving an indication that the processor instruction to be fetched corresponds to the interrupt ITAG (CIA) or that the processor instruction to be fetched corresponds to the processor instruction following the processor instruction corresponding to the interrupt ITAG (NIA).

The method of FIG. 8 also differs from the method of FIG. 4, however, in that identifying (414) the EA for the interrupt ITAG (432) using the EA offset (430) and the range of EAs in the retrieved EAT row (422) includes identifying (804) one of the group consisting of the NIA and the CIA for the interrupt ITAG (420). Identifying (804) one of the group consisting of the NIA and the CIA for the interrupt ITAG (420) may be carried out by fetching, by the instruction fetch unit (306), a processor instruction corresponding to the received interrupt ITAG (420) according to the CIA or NIA indication. For a CIA indication, the instruction fetch unit (306) may begin fetching the processor instruction corresponding to the received interrupt ITAG (420). For a NIA indication, the instruction fetch unit (306) may begin fetching the next processor instruction after the processor instruction corresponding to the received interrupt ITAG (420).

Exemplary embodiments of the present invention are described largely in the context of a fully functional computer system for identifying an EA using an interrupt ITAG in a multi-slice processor. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of identifying an effective address (EA) using an interrupt instruction tag (ITAG), the method comprising:
   receiving, by an instruction fetch unit of a multi-slice computer processor, an interrupt ITAG;
   retrieving an effective address table (EAT) row from an EAT, wherein the EAT row comprises a range of EAs and a first ITAG of a range of ITAGs associated with the range of EAs, the range of ITAGs comprising the interrupt ITAG;
   generating a mask using the retrieved EAT row by generating a bit vector to mask each element of a processor instruction vector except particular elements that correspond to the range of ITAGs that begin with the first ITAG in the retrieved EAT row, wherein the processor instruction vector comprises a plurality of elements;
   accessing the processor instruction vector, wherein each element corresponds to one of a plurality of ITAGs, and wherein one or more of the elements include a flag set indicating a processor instruction decoded for one or more of the plurality of ITAGs;
   applying the mask to the processor instruction vector to obtain a portion of the processor instruction vector that begins with an element corresponding to the first ITAG and is defined by an element corresponding to the interrupt ITAG;
   calculating an EA offset equal to a number of elements in the portion of the processor instruction vector having a flag set by counting the number of flags set in the instruction vector among elements beginning with the element corresponding to the first ITAG and extending to, but not including, the element corresponding to the interrupt ITAG; and
   identifying the EA for the interrupt ITAG using the EA offset and the range of EAs in the retrieved EAT row.

2. The method of claim 1 further comprising:
   providing the EA to an instruction fault address register, wherein the instruction fault address register uses the EA to refetch a processor instruction.

3. The method of claim 1 wherein the interrupt ITAG is received in response to a register flush.

4. The method of claim 1 wherein retrieving the EAT row from the EAT comprises:
   for each row in the EAT:
   comparing the interrupt ITAG to a first ITAG of the row; and
   if the interrupt ITAG is greater than the first ITAG, setting a flag; and
   identifying, as the EAT row that includes the interrupt ITAG, a last row in the EAT having the flag set.

5. The method of claim 1 wherein identifying the EA for the interrupt ITAG using the EA offset and the range of EAs in the retrieved EAT row comprises:
   adding the EA offset to a first EA in the range of EAs in the retrieved EAT row.

6. The method of claim 1,
   wherein receiving the interrupt ITAG comprises receiving a request for one of a group consisting of a next instruction address and a completed instruction address, and
   wherein identifying the EA for the interrupt ITAG comprises identifying one of the group consisting of the next instruction address and the completed instruction address for the interrupt ITAG.

7. The method of claim 1 wherein the EA is unused outside of the instruction fetch unit.

8. A multi-slice computer processor for identifying an effective address (EA) using an interrupt instruction tag (ITAG), the multi-slice computer processor configured for:
   receiving, by an instruction fetch unit of a multi-slice computer processor, an interrupt ITAG;
   retrieving, by the instruction fetch unit of a multi-slice computer processor, an effective address table (EAT) row from an EAT, wherein the EAT row comprises a range of EAs and a first ITAG of a range of ITAGs associated with the range of EAs, the range of ITAGs comprising the interrupt ITAG;
   generating, by the instruction fetch unit of a multi-slice computer processor, a mask using the retrieved EAT row by generating a bit vector to mask each element of a processor instruction vector except particular elements that correspond to the range of ITAGs that begin with the first ITAG in the retrieved EAT row, wherein the processor instruction vector comprises a plurality of elements;
   accessing the processor instruction vector, by the instruction fetch unit of a multi-slice computer processor, wherein each element corresponds to one of a plurality of ITAGs, and wherein one or more of the elements include a flag set indicating a processor instruction decoded for one or more of the plurality of ITAGs;
   applying the mask to the processor instruction vector, by the instruction fetch unit of a multi-slice computer processor, to obtain a portion of the processor instruction vector that begins with an element corresponding to the first ITAG and is defined by an element corresponding to the interrupt ITAG;
   calculating, by the instruction fetch unit of a multi-slice computer processor, an EA offset equal to a number of elements in the portion of the processor instruction vector having a flag set by counting the number of flags set in the instruction vector among elements beginning with the element corresponding to the first ITAG and extending to, but not including, the element corresponding to the interrupt ITAG; and
   identifying the EA for the interrupt ITAG, by the instruction fetch unit of a multi-slice computer processor, using the EA offset and the range of EAs in the retrieved EAT row.

9. The multi-slice computer processor of claim 8 further configured for:
   providing the EA to an instruction fault address register, wherein the instruction fault address register uses the EA to refetch a processor instruction.

10. The multi-slice computer processor of claim 8 wherein the interrupt ITAG is received in response to a register flush.

11. The multi-slice computer processor of claim 8 wherein retrieving the EAT row from the EAT comprises:
for each row in the EAT:
comparing the interrupt ITAG to a first ITAG of the row; and
if the interrupt ITAG is greater than the first ITAG, setting a flag; and
identifying, as the EAT row that includes the interrupt ITAG, a last row in the EAT having the flag set.

12. The multi-slice computer processor of claim 8 wherein identifying the EA for the interrupt ITAG using the EA offset and the range of EAs in the retrieved EAT row comprises:
adding the EA offset to a first EA in the range of EAs in the retrieved EAT row.

13. The multi-slice computer processor of claim 8,
wherein receiving the interrupt ITAG comprises receiving a request for one of a group consisting of a next instruction address and a completed instruction address, and
wherein identifying the EA for the interrupt ITAG comprises identifying one of the group consisting of the next instruction address and the completed instruction address for the interrupt ITAG.

14. The multi-slice computer processor of claim 8 wherein the EA is unused outside of the instruction fetch unit.

15. A computing system, the computing system including a multi-slice computer processor for identifying an effective address (EA) using an interrupt instruction tag (ITAG), the multi-slice computer processor configured for:
receiving, by an instruction fetch unit of a multi-slice computer processor, an interrupt ITAG;
retrieving an effective address table (EAT) row from an EAT, wherein the EAT row comprises a range of EAs and a first ITAG of a range of ITAGs associated with the range of EAs, the range of ITAGs comprising the interrupt ITAG;
generating a mask using the retrieved EAT row by generating a bit vector to mask each element of a processor instruction vector except particular elements that correspond to the range of ITAGs that begin with the first ITAG in the retrieved EAT row, wherein the processor instruction vector comprises a plurality of elements;
accessing the processor instruction vector, wherein each element corresponds to one of a plurality of ITAGs, and wherein one or more of the elements include a flag set indicating a processor instruction decoded for one or more of the plurality of ITAGs;
applying the mask to the processor instruction vector to obtain a portion of the processor instruction vector that begins with an element corresponding to the first ITAG and is defined by an element corresponding to the interrupt ITAG;
calculating an EA offset equal to a number of elements in the portion of the processor instruction vector having a flag set by counting the number of flags set in the instruction vector among elements beginning with the element corresponding to the first ITAG and extending to, but not including, the element corresponding to the interrupt ITAG; and
identifying the EA for the interrupt ITAG using the EA offset and the range of EAs in the retrieved EAT row.

16. The computing system of claim 15, the multi-slice computer processor further configured for:
providing the EA to an instruction fault address register, wherein the instruction fault address register uses the EA to refetch a processor instruction.

17. The computing system of claim 15, wherein the interrupt ITAG is received in response to a register flush.

18. The computing system of claim 15 wherein retrieving the EAT row from the EAT comprises:
for each row in the EAT:
comparing the interrupt ITAG to a first ITAG of the row; and
if the interrupt ITAG is greater than the first ITAG, setting a flag; and
identifying, as the EAT row that includes the interrupt ITAG, a last row in the EAT having the flag set.

19. The computing system of claim 15 wherein identifying the EA for the interrupt ITAG using the EA offset and the range of EAs in the retrieved EAT row comprises:
adding the EA offset to a first EA in the range of EAs in the retrieved EAT row.

20. The computing system of claim 15,
wherein receiving the interrupt ITAG comprises receiving a request for one of a group consisting of a next instruction address and a completed instruction address, and
wherein identifying the EA for the interrupt ITAG comprises identifying one of the group consisting of the next instruction address and the completed instruction address for the interrupt ITAG.

* * * * *